United States Patent
Matsushita et al.

(10) Patent No.: US 6,887,807 B1
(45) Date of Patent: May 3, 2005

(54) BREATHABLE LIQUID-IMPERVIOUS COMPOSITE SHEET

(75) Inventors: Michiyo Matsushita, Kagawa (JP); Takeshi Hanajiri, Kagawa (JP)

(73) Assignee: Uni-Charm Co., Ltd., Ehime-ken (JP)

( * ) Notice: Subject to any disclaimer, the term of this patent is extended or adjusted under 35 U.S.C. 154(b) by 78 days.

(21) Appl. No.: 10/030,728

(22) PCT Filed: Jul. 12, 2000

(86) PCT No.: PCT/JP00/04664

§ 371 (c)(1), (2), (4) Date: Jan. 11, 2002

(87) PCT Pub. No.: WO01/03915

PCT Pub. Date: Jan. 18, 2001

(30) Foreign Application Priority Data

Jul. 12, 1999 (JP) .......................... 11-198218

(51) Int. Cl.[7] ................................ B32B 5/26
(52) U.S. Cl. .................. 442/381; 442/65; 442/394; 442/398; 428/200; 428/347
(58) Field of Search .................. 442/65, 381, 394, 442/398; 428/200, 347

(56) References Cited

U.S. PATENT DOCUMENTS

| | | | | |
|---|---|---|---|---|
| 4,522,203 A | * | 6/1985 | Mays | 128/849 |
| 6,037,281 A | * | 3/2000 | Mathis et al. | 442/394 |
| 6,045,900 A | * | 4/2000 | Haffner et al. | 428/315.9 |
| 6,075,179 A | * | 6/2000 | McCormack et al. | 604/367 |
| 6,286,145 B1 | * | 9/2001 | Welchel et al. | 2/69 |

FOREIGN PATENT DOCUMENTS

| | | |
|---|---|---|
| JP | 1-62316 | 4/1989 |
| JP | 2-22317 | 2/1990 |
| WO | WO 96/19346 | 6/1996 |
| WO | WO 97/45259 | 12/1997 |
| WO | WO 99/27877 | 6/1999 |
| WO | WO 99/28129 | 6/1999 |

* cited by examiner

Primary Examiner—Elizabeth M. Cole
Assistant Examiner—Norca L. Torres
(74) Attorney, Agent, or Firm—Butzel Long

(57) ABSTRACT

A breathable liquid-impervious composite sheet of a comfortable touch which is free from generation of fibrous waste. The composite sheet includes opposite surfaces of a breathable liquid-impervious sheet made of thermoplastic synthetic resin which are covered with continuous fibers.

9 Claims, 2 Drawing Sheets

BREATHABLE LIQUID-IMPERVIOUS COMPOSITE SHEET

TECHNICAL FIELD OF THE INVENTION

This invention relates to breathable liquid-impervious composite sheets as stock material for disposable garments such as disposable working clothes.

RELATED ART

A breathable liquid-impervious composite sheet is well known, which comprises a breathable liquid-impervious film of thermoplastic synthetic resin and a nonwoven fabric of thermoplastic synthetic fiber laminated on one surface of the film. Such a sheet has been used, for example, as a backsheet of a disposable diaper. The film makes this backsheet breathable and liquid-impervious and the nonwoven fabric gives this backsheet cloth-like soft touch.

In the composite sheet of prior art, the nonwoven fabric comprises staple fibers each having a length of 50 mm which may sometimes fall off from the composite sheet. In view of this, this composite sheet of prior art is not suitable as stock material for gowns or working clothes used in medical site or in food plant wherein generation of dust, dirt and fibrous waste are prohibited. This composite sheet of prior art is disadvantageous also in that its one surface is defined by the film destined to come directly in contact with the wearer's skin. Some of the wearers have antipathy to a touch peculiar to the film and, also in view of this, it is not preferable to use the composite sheet of prior art as stock material for gowns or the like which inevitably comes in direct contact with the wearer's skin.

It is an object of this invention to provide a composite sheet that is free from generation of fibrous waste and offers a comfortable touch.

DISCLOSURE OF THE INVENTION

The breathable liquid-impervious composite sheet according to the present invention comprises a breathable liquid-impervious sheet made of thermoplastic synthetic resin that is covered with thermoplastic synthetic fibers. The synthetic fibers are continuous fibers. The sheet made of synthetic resin has its opposite surfaces covered with the continuous fibers and the sheet made of synthetic resin is intermittently bonded to the continuous fibers on the opposite surfaces.

The sheet made of synthetic resin is an air-permeable and liquid-impervious assembly of thermoplastic fibers, the assembly having a maximum breathability of 200 sec/100 cc as measured in accordance with the method B of JIS (Japanese Industrial Standards) L 1096 and a water resistance of at least 300 mm as measured in accordance with the method A of JIS L 1092.

DESCRIPTION OF THE PREFERRED EMBODIMENTS

Details of a breathable liquid-impervious composite sheet will be more fully understood from the description given hereunder with reference to the accompanying drawings.

Figure 1:
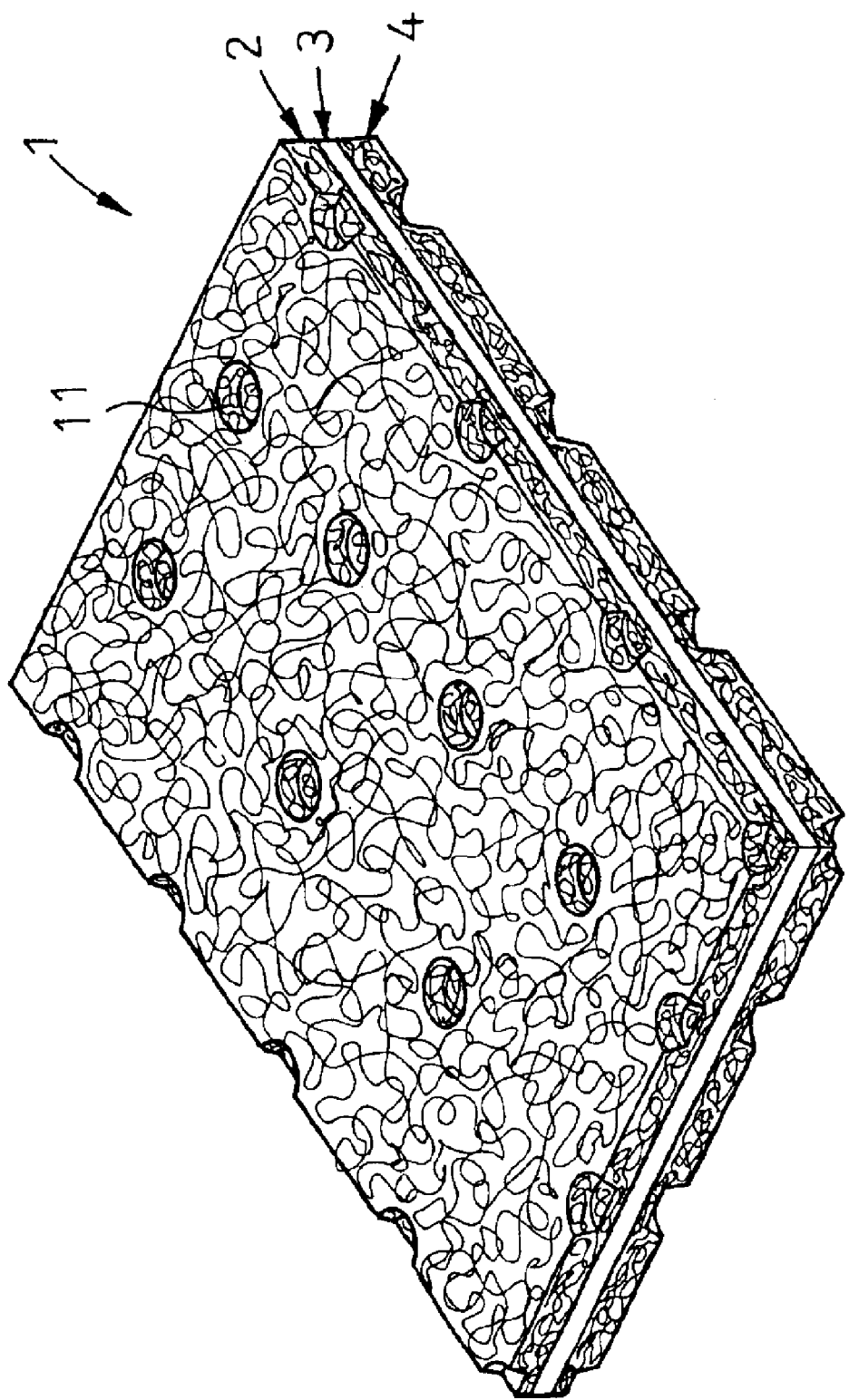
FIG. 1 is a perspective view of a composite sheet according to this invention.
Figure 2:
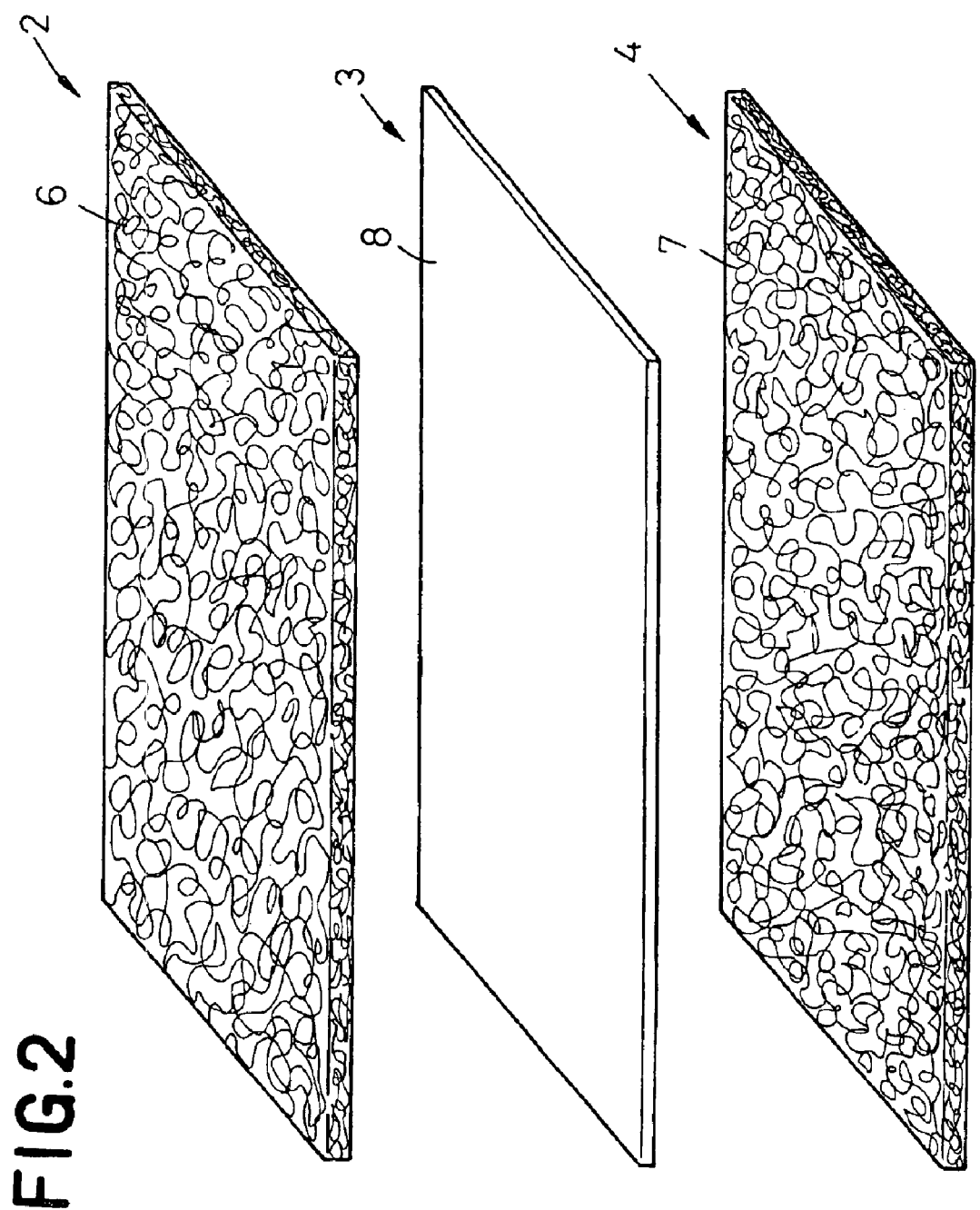
FIG. 2 is an exploded perspective view of the composite sheet.

FIG. 1 is a perspective view of a composite sheet according to this invention and FIG. 2 is an exploded perspective view of the composite sheet. A composite sheet 1 has upper and lower layers 2, 4 and an intermediate layer 3 disposed between these upper and lower layers 2, 4. The upper and lower layers 2, 4 have a breathability equal to or higher than that of the intermediate layer 3. The upper and lower layers 2, 4 respectively comprise a plurality of continuous fibers 6, 7 extending to describe irregular curves on upper and lower surfaces of the intermediate layer 3. The continuous fibers 6 of the upper layer 2 and the continuous fibers 7 of the lower layer 4 respectively have a basis weight of 10–100 g/m² and may be respectively sealed together at their intersections. The continuous fibers 6, 7 may be selected from a group including polypropyrene fiber and conjugated fiber comprising polypropyrene or polyester as a core and polyethylene as a sheath.

The intermediate layer 3 is formed by a breathable liquid-impervious sheet made of thermoplastic synthetic resin, for example, stretched film 8 made of thermoplastic synthetic resin such as polyethylene. The stretched film 8 has a thickness of 0.01–0.1 mm and contains inorganic filler grains of calcium carbonate or barium sulfate. The intermediate layer 3 may be formed also from a fibrous assembly such as a melt blown nonwoven fabric made of polypropyrene or the like. Breathable liquid-impervious nature of the intermediate layer 3 can be quantitatively expressed by breathability and water resistance. Preferably, the intermediate layer 3 has the maximum breathability of 200 sec/100 cc as measured in accordance with the method B of JIS L 1096 and a water resistance of at least 300 mm as measured in accordance with the method A of JIS L 1092.

The upper and lower layers 2, 4 and the intermediate layer 3 are bonded together in bond regions 11 (See FIG. 1) intermittently formed over the composite sheet 1. It should be understood that such bond regions are not shown in FIG. 2 showing the composite sheet in an exploded perspective view. While it is not critical how to configure the bond regions 11, each of these bond regions 11 has an area of 0.5–10 mm² and a total area of them occupies 1–30% of the composite sheet's surface area. Bonding of the respective layers 2–4 may be carried out not only by means of sealing technique but also by means of suitable adhesive such as hot melt adhesive.

The composite sheet formed in the manner as has been described above is advantageously free from an apprehensive generation of fibrous waste when this composite sheet is used as stock material for working clothes or gowns for surgical operation. This is for the reason that the upper and lower layers comprise the continuous fibers. Additionally, the upper and lower layers present a cloth-like touch and therefore the wearer does not experience a feeling of incompatibility possibly presented by the film of thermoplastic synthetic resin even when the working clothes come in direct contact with the wearer's skin.

Accordingly, this composite sheet is suitable as the surface material of disposable garment for which the breathable and liquid-impervious nature is required, for example, disposable working clothes, disposable gowns for surgical operation, disposable trousers, disposable shorts or disposable diapers.

What is claimed is:

1. A breathable liquid-impervious composite sheet comprising:

a breathable liquid-impervious sheet having opposite surfaces and comprising an air-pervious and liquid-impervious assembly of thermoplastic synthetic fibers; and second thermoplastic synthetic fibers covering said opposite surfaces of said breathable liquid-impervious sheet, said second thermoplastic synthetic fibers comprising continuous fibers, said breathable liquid-impervious sheet being intermittently bonded to said continuous second thermoplastic synthetic fibers on said opposite surfaces, said breathable liquid-impervious sheet having a maximum breathability of about 200 sec/100 cc, and a water resistance of at least about 300 mm.

2. The breathable liquid-impervious composite sheet according to claim 1, wherein said continuous thermoplastic synthetic fibers comprise layers that have a breathability that is equal to a breathability of said breathable liquid-impervious sheet.

3. The breathable liquid-impervious composite sheet according to claim 1, wherein said continuous thermoplastic synthetic fibers comprise layers that have a breathability that is greater than a breathability of said breathable liquid-impervious sheet.

4. The breathable liquid-impervious composite sheet according to claim 1, wherein said continuous second thermoplastic synthetic fibers have a basis weight if about 10 to about 100 g/m$^2$.

5. The breathable liquid-impervious composite sheet according to claim 1, wherein said continuous second thermoplastic synthetic fibers are sealed together at intersection thereof.

6. The breathable liquid-impervious composite sheet according to claim 1, wherein said breathable liquid-impervious sheet is intermittently bonded to said continuous second thermoplastic synthetic fibers at discrete bond regions.

7. The breathable liquid-impervious composite sheet according to claim 6, wherein the each of the discrete bond regions comprises an area of about 0.5 to about 10 mm$^2$.

8. The breathable liquid-impervious composite sheet according to claim 6, wherein a total area of all of the discrete bond regions comprises about 1 to about 30% of a total area of the composite sheet.

9. The breathable liquid-impervious composite sheet according to claim 1, wherein said air-pervious and liquid-impervious assembly of thermoplastic synthetic fibers is a melt blown nonwoven fabric.

* * * * *